Patented Apr. 11, 1933

1,903,600

UNITED STATES PATENT OFFICE

HUGO SCHWEITZER, OF LEVERKUSEN-WIESDORF, GERMANY, ASSIGNOR TO GENERAL ANILINE WORKS, INC., OF NEW YORK, N. Y., A CORPORATION OF DELAWARE

AZO DYESTUFFS

No Drawing. Application filed May 11, 1931, Serial No. 536,664, and in Germany May 24, 1930.

The present invention relates to new azo-dyestuffs, more particularly it relates to dyestuffs which may be represented by the probable general formula:

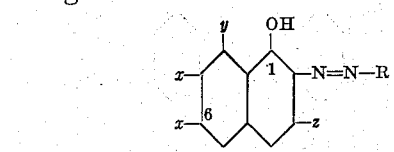

in which $z$ and one $x$ stand for a sulfonamide group, the hydrogen atoms of which may be partially or wholly substituted by alkyl or a radical of the benzene series, the other $x$ stands for hydrogen, $y$ stands for hydrogen which in case the $x$ in the 6-position of the naphthalene nucleus stands for a sulfonamide group may be substituted by halogen or a sulfonamide group the hydrogen atoms of which may be substituted by alkyl or a radical of the benzene series, and R stands for a benzene or naphthalene nucleus containing at least one sulfonic acid group and which may be otherwise substituted by monovalent substituents, for example, by alkyl, alkoxy, halogen, the nitro-group, an acylamino group and the hydroxy group.

My new dyestuffs are obtainable by coupling in aqueous alkaline solution a diazotized amino-sulfonic acid of the benzene or naphthalene series with a 1-naphthol-3.6- or 3.7-disulfonic acid amide or an N-alkyl or phenyl substitution product thereof which naphthol-3.6-disulfonic acid amide may be substituted in the 8-position by halogen or a further sulfonamide group the hydrogen atoms of which may be substituted by alkyl or a radical of the benzene series.

The new dyestuffs are in form of their alkali metal salts generally water soluble dark substances, soluble in concentrated sulfuric acid with a red to bluish-violet coloration, and dyeing wool from an acid bath clear red to blue shades which are distinguished by a good fastness to light, very good fastness to washing and fulling and unobjectionable capacity for even dyeing. They are also very suitable for the manufacture of color lakes and for printing.

The invention is illustrated by the following examples, without being limited thereto:

*Example 1.*—17.3 parts by weight of aniline-2-sulfonic acid are diazotized in the customary manner. The diazo compound is run into a sodium carbonate solution of 48.2 parts by weight of 1-naphthol-3.6-disulfonic acid-di-(N-methylanilide). When the coupling is complete the dyestuff which has in its free state the following formula:

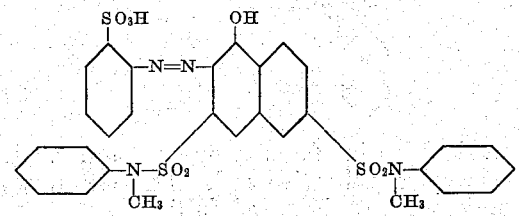

is salted out, filtered with suction and dried. It dyes wool a clear orange of good fastness to fulling and light and good evenness.

When the aniline-2-sulfonic acid is replaced by 4-methoxy-1-aminobenzene-2-sulfonic acid or by 4-methyl-1-aminobenzene-2-sulfonic acid or by 4-acetylamino-1-aminobenzene-2-sulfonic acid bluish red shades of similar properties result.

*Example 2.*—18.7 parts by weight of 4-methyl-1-aminobenzene-2-sulfonic acid are diazotized in the customary manner. The diazo compound is run into a sodium carbonate solution of 45.4 parts by weight of 1-naphthol-3.6-disulfonic acid-di-anilide. When the coupling is complete the dyestuff having in its free state the following formula:

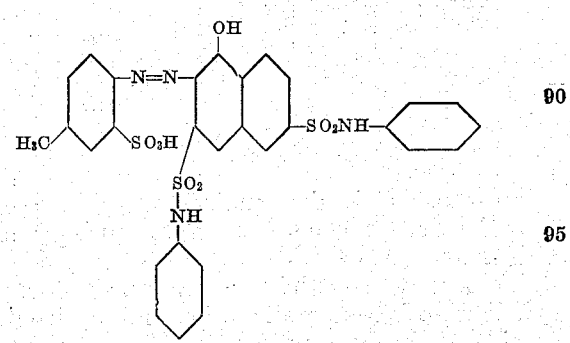

is worked up in the customary manner. It dyes wool a yellowish red of good fastness to fulling and light and good evenness.

When the 4-methyl-1-aminobenzene-2-sulfonic acid is replaced by other amino-sulfonic acids of the benzene series and the 1-naphthol-3.6-disulfonic acid-di-(anilide) by corresponding chloroanilides, toluidides and the like dyestuffs of similar properties result.

*Example 3.*—20.7 parts by weight of 4-chloro-1-aminobenzene-2-sulfonic acid are diazotized in the customary manner. The diazo compound is run into a sodium carbonate solution of 54.5 parts by weight of 1-naphthol-3.6-disulfonic acid-di-(N-hydroxyethylanilide). When the coupling is complete the dyestuff having in its free state the following formula:

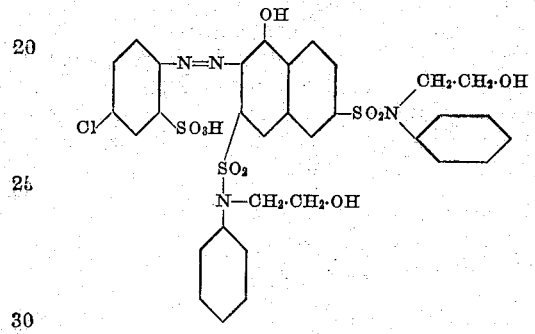

is worked up in the customary manner. It dyes wool a yellowish red. The very even dyeing is fast to light and fulling.

When the chloro-1-aminobenzene-2-sulfonic acid is replaced by other amino-sulfonic acids of the benzene series, such as for example, 4 - amino - acetanilide - 3 - sulfonic acid, 4-methyl-1-amino-benzene-2-sulfonic acid or the like dyestuffs of similar properties result.

*Example 4.*—18.7 parts by weight of 4-methyl-1-aminobenzene-2-sulfonic acid are diazotized in the customary manner. The diazo compound is run into soda alkaline solution of 24.2 parts by weight of 1-naphthol-3.6-disulfo-di-dimethylamide. When the coupling is complete, the dyestuff having in its free state the following formula:

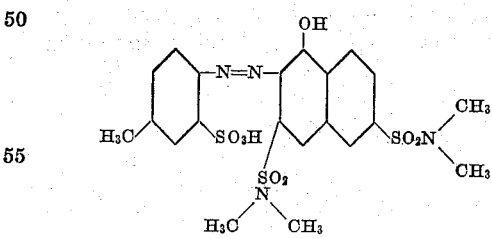

is worked up in the usual manner. It dyes wool a red of good fastness to fulling and light and good evenness.

When the 4-methyl-1-aminobenzene-2-sulfonic acid is replaced by other aminosulfonic acids of the benzene series and the 1-naphthol-3.6-disulfo-di-dimethylamide by 1-naphthol-3.6-disulfo-diamide or the 1-naphthol-3.6-disulfo-methylamide dyestuffs of similar properties result.

*Example 5.*—20.1 parts by weight of m-xylidine-o-sulfonic acid are diazotized in the customary manner. The diazo compound is run into a sodium carbonate solution of 56.8 parts by weight of 1-naphthol-3.6-disulfonic acid-di-(3'-acetylaminoanilide). When the coupling is complete the dyestuff having in its free state the following formula:

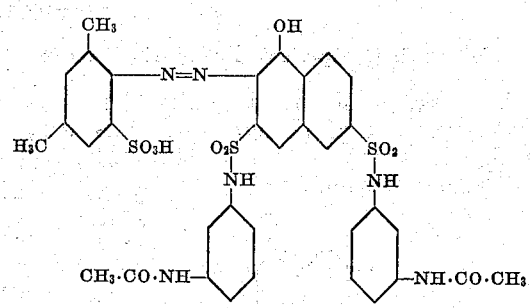

is worked up in the known manner.

It dyes wool a clear yellowish red of very good fastness to fulling and light besides very good evenness. When the 1-naphthol-3.6-disulfonic acid-di-(3'-acetylamino-anilide) is replaced by 1-naphthol-3.6-disulfonic acid-di-(4'-acetylaminoanilide) or the 4-methyl-1-aminobenzene-2-sulfonic acid by other amino sulfonic acids of the benzene series dyestuffs of similar properties result.

*Example 6.*—18.7 parts by weight of 4-methyl-1-aminobenzene-2-sulfonic acid are diazotized in the customary manner. The diazo compound is run into a sodium carbonate solution of 48.8 parts by weight of 8-chloro-1-naphthol-3.6-disulfonic acid-dianilide. When the coupling is complete the dyestuff having in its free state the following formula:

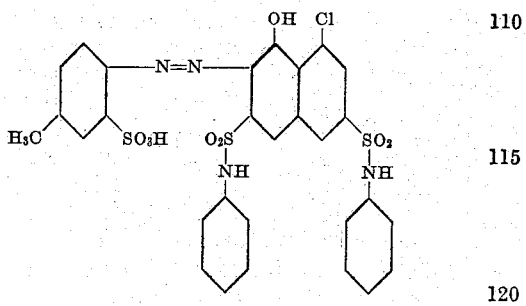

is worked up. It dyes wool a clear red, which is very fast to light and fulling and very even.

*Example 7.*—18.6 parts by weight of 4-methyl-1-aminobenzene-2-sulfonic acid are diazotized in the customary manner. The diazo compound is run into a sodium carbonate solution of 61.1 parts by weight of 1-naphthol-3.6.8-trisulfonic acid-tri-anilide. When the coupling is complete the dyestuff having in its free state the following formula:

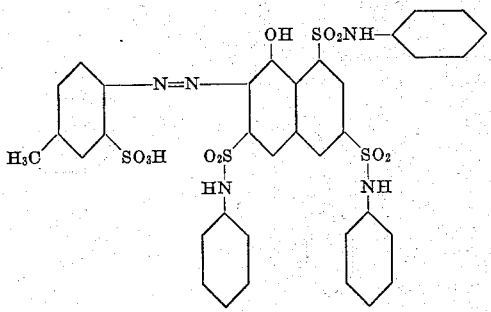

is salted out, filtered, pressed and dried.

It dyes wool a red shade of very good fastness to light and fulling besides good evenness.

*Example 8.*—26.7 parts by weight of 1-amino-2-naphtholethylether-6-sulfonic acid are diazotized in the customary manner. The diazo compound is run into a sodium carbonate solution of 56.8 parts by weight of 1-naphthol-3.6-disulfonic acid-di-(3'-acetylaminoanilide). When the coupling is complete the dyestuff having in its free state the following formula:

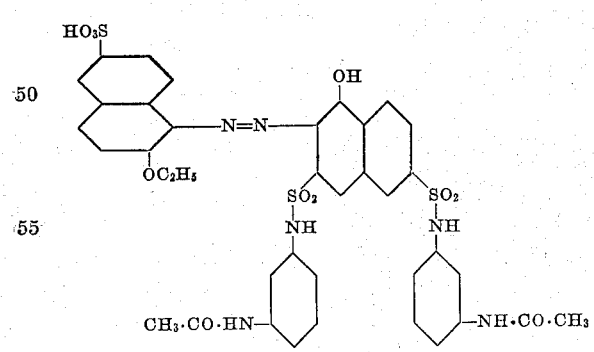

is salted out, filtered, pressed and dried.

It dyes wool a clear violet, fast to washing and fulling and of very good evenness.

When the 1-naphthol-3.6-disulfonic acid-di-(3'-acetylamino-anilide) is replaced by 1-naphthol-3.6-disulfonic acid-di-(4'-acetylaminoanilide) a dyestuff of similar properties results.

*Example 9.*—23 parts by weight of 4-acetylamino-1-amino-benzene-2-sulfonic acid are diazotized and the diazo compound is added to a solution rendered alkaline with sodium carbonate of 45.4 parts by weight of 1-naphthol-3.7-disulfonic acid-dianilide. When the coupling is complete the dyestuff having in its free state the following formula:

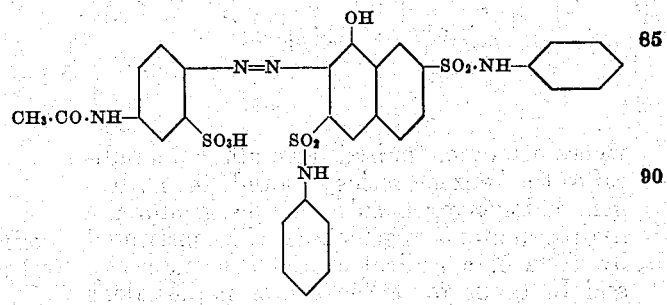

is isolated in the usual way.

It dyes wool a bluish-red of good fastness to light, washing and fulling and good evenness.

The 4-acetylamino-1-aminobenzene-2-sulfonic acid can be replaced by other aminosulfonic acids of the benzene series; the 1-naphthol-3.7-disulfonic-acid-dianilide can be replaced by the 3.7-disulfonic acid-di-(3'-acetylaminoanilide) or other anilides. Dyes of similar properties are thus obtained.

I claim:

1. Azodyestuffs of the probable general formula:

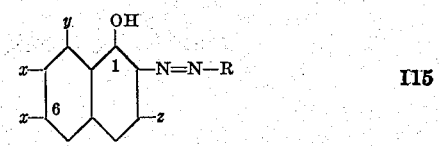

wherein $z$ and one $x$ stand for a sulfonamide group, the hydrogen atoms of which may be substituted by alkyl or a radical of the benzene series, the other $x$ stands for hydrogen; $y$ stands for hydrogen which in case the $x$ in the 6-position of the naphthalene nucleus stands for a sulfonamide group may be substituted by halogen or a sulfonamide group the hydrogen atoms of which may be substituted by alkyl or a radical of the benzene series, and R stands for a benzene or naphthalene nucleus, containing at least one sulfonic acid group and which nucleus may be otherwise substituted by substituents of the group consisting of alkyl, alkoxy, halogen, an acylamino group, the hydroxy-group and the nitro group, being in form of their alkali metal salts generally water soluble dark substances, soluble in concentrated sulfuric acid with a red to bluish-violet coloration and dyeing wool from an acid bath clear red to blue shades which are distinguished by a good fastness to light, washing and fulling.

2. Azodyestuffs of the probable general formula:

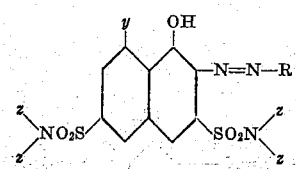

wherein $z$ stands for hydrogen, alkyl or a radical of the benzene series, $y$ stands for hydrogen, halogen or a sulfonamide group, the hydrogen atoms of which may be substituted by alkyl or a radical of the benzene series and R stands for a benzene or naphthalene nucleus containing at least one sulfonic acid group and which nucleus may be otherwise substituted by alkyl, alkoxy, halogen, an acylamino group, the hydroxy group and the nitro group, being in form of their alkali metal salts generally water soluble dark substances, soluble in concentrated sulfuric acid with a red to bluish-violet coloration and dyeing wool from an acid bath clear red to blue shades which are distinguished by a good fastness to light, washing and fulling.

3. Azo dyestuffs of the probable general formula:

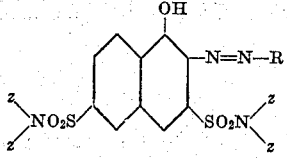

wherein $z$ stands for alkyl or a radical of the benzene series and R stands for a benzene nucleus containing at least one sulfonic acid group and which nucleus may be otherwise substituted by alkyl, alkoxy, halogen, an acylamino group, the hydroxy group and the nitro group, being in form of their alkali metal salts generally water soluble dark substances, soluble in concentrated sulfuric acid with a red to bluish-violet coloration and dyeing wool from an acid bath clear red to blue shades which are distinguished by a good fastness to light, washing and fulling.

4. The azodyestuff of the following formula:

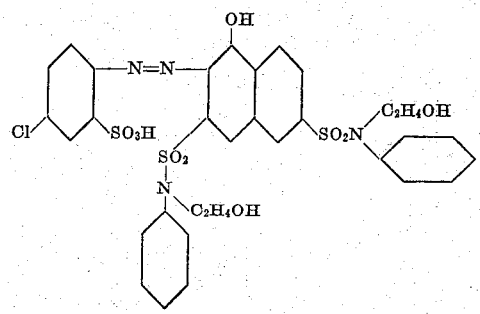

dyeing wool a yellowish red of good fastness to light and fulling.

5. The azodyestuff of the following formula:

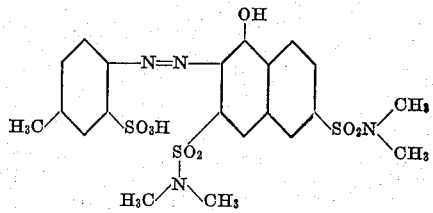

dyeing wool a red shade of good fastness to fulling and light.

In testimony whereof, I affix my signature.

HUGO SCHWEITZER.